(12) United States Patent
Rokka

(10) Patent No.: US 10,105,647 B2
(45) Date of Patent: Oct. 23, 2018

(54) METHOD OF REDUCING SULFUR DIOXIDE CONTENT IN FLUE GAS EMANATING FROM A CIRCULATING FLUIDIZED BED BOILER PLANT

(71) Applicant: SUMITOMO SHI FW ENERGIA OY, Espoo (FI)

(72) Inventor: Antti Rokka, Leppävirta (FI)

(73) Assignee: Sumitomo SHI FW Energia Oy, Espoo (FI)

( * ) Notice: Subject to any disclaimer, the term of this patent is extended or adjusted under 35 U.S.C. 154(b) by 0 days.

(21) Appl. No.: 15/748,347

(22) PCT Filed: Oct. 27, 2016

(86) PCT No.: PCT/FI2016/050753
§ 371 (c)(1),
(2) Date: Jan. 29, 2018

(87) PCT Pub. No.: WO2017/077180
PCT Pub. Date: May 11, 2017

(65) Prior Publication Data
US 2018/0214820 A1 Aug. 2, 2018

(30) Foreign Application Priority Data

Nov. 4, 2015 (FI) .................................. 20155805

(51) Int. Cl.
*B01D 53/50* (2006.01)
*B01D 53/83* (2006.01)
*B01D 53/14* (2006.01)
*F23C 10/10* (2006.01)

(52) U.S. Cl.
CPC ....... *B01D 53/508* (2013.01); *B01D 53/1412* (2013.01); *B01D 53/1481* (2013.01); *F23C 10/10* (2013.01); *B01D 2251/404* (2013.01); *B01D 2251/606* (2013.01); *B01D 2257/302* (2013.01); *B01D 2258/0283* (2013.01)

(58) Field of Classification Search
CPC .. B01D 53/1481; B01D 53/50; B01D 53/508; B01D 53/83; B01D 2251/404; B01D 2253/1124; B01D 2257/302; B01D 2258/0283
See application file for complete search history.

(56) References Cited

U.S. PATENT DOCUMENTS

| | | | |
|---|---|---|---|
| 4,309,393 A | 1/1982 | Nguyen | |
| 5,171,552 A | 12/1992 | Miura et al. | |
| 5,424,043 A * | 6/1995 | Martin | B01D 53/343 110/236 |
| 5,885,539 A | 3/1999 | Bjarnø et al. | |
| 7,427,384 B2 * | 9/2008 | Kinnunen | F23C 10/002 423/243.08 |
| 7,625,537 B2 | 12/2009 | Rader et al. | |
| 7,862,789 B2 | 1/2011 | Gatton, Jr. et al. | |
| 9,016,243 B2 | 4/2015 | Lankinen et al. | |
| 9,802,151 B2 * | 10/2017 | Kamiyama | B01D 53/501 |
| 2013/0284121 A1 * | 10/2013 | Kuivalainen | F23C 10/002 122/406.1 |

FOREIGN PATENT DOCUMENTS

| | | |
|---|---|---|
| DE | 4104180 C1 | 6/1992 |
| JP | 03-59309 A | 3/1991 |
| JP | 03-202125 A | 9/1991 |
| JP | 03-202127 A | 9/1991 |
| JP | 05-309229 A | 11/1993 |
| JP | 2000-350920 A | 12/2000 |
| JP | 2003-292321 A | 10/2003 |
| JP | 2008-503707 A | 2/2008 |
| RU | 2438761 C2 | 1/2012 |
| RU | 2495326 C2 | 10/2013 |
| TJ | 338 B | 7/2002 |
| WO | 96/15846 | 5/1996 |
| WO | 2010/097976 A1 | 9/2010 |

OTHER PUBLICATIONS

Notification of and International Search Report and Written Opinion dated Feb. 7, 2017, in corresponding International Patent Application No. PCT/FI2016/050753.
Notification of and International Preliminary Report on Patentability dated Oct. 19, 2017, in corresponding International Patent Application No. PCT/FI2016/050753.
Office Action dated Jun. 30, 2018, issued in corresponding Japanese Patent Application No. 2018-504905.
Office Action dated Jul. 3, 2018, issued in corresponding Russian Patent Application No. 2018103215.

* cited by examiner

*Primary Examiner* — Timothy C Vanoy
(74) *Attorney, Agent, or Firm* — Fitzpatrick, Cella, Harper & Scinto

(57) ABSTRACT

A method of reducing sulfur dioxide emissions of a circulating fluidized bed boiler plant. A first stream of sulfur-containing carbonaceous fuel is fed at a first feeding rate to a furnace of the boiler. A second stream of calcium carbonate containing absorbent having a predetermined d50 particle size is fed at a second feeding rate to the furnace. Oxygen containing gas is fed to the furnace for fluidizing a bed of particles forming in the furnace. Fuel is combusted with the oxygen and the sulfur in the fuel is oxidized to sulfur dioxide. The calcium carbonate is calcined to calcium oxide in the furnace. A portion of the calcium oxide is used to sulfate a first portion of the sulfur dioxide to calcium sulfate in the furnace.

13 Claims, 2 Drawing Sheets

METHOD OF REDUCING SULFUR DIOXIDE CONTENT IN FLUE GAS EMANATING FROM A CIRCULATING FLUIDIZED BED BOILER PLANT

CLAIM OF PRIORITY

This application is a U.S. national stage application of PCT International Application No. PCT/FI2016/050753, filed Oct. 27, 2016, which claims priority from Finnish Patent Application No. 20155805, filed Nov. 4, 2015.

FIELD OF THE INVENTION

The present invention relates to a method of reducing sulfur dioxide content in flue gas emanating from a circulating fluidized bed boiler plant. More specifically, the present invention relates to a method of reducing sulfur dioxide content in the flue gas emanating from a circulating fluidized bed boiler plant comprising a semi-dry scrubber.

BACKGROUND OF THE INVENTION

When combusting sulfur-containing fuels, the sulfur in the fuel is converted to sulfur oxides, mainly, sulfur dioxide ($SO_2$), which may be harmful if emitted to the environment in large quantities. A well-known advantage of a circulating fluidized bed (CFB) boiler is the possibility to efficiently capture $SO_2$ already in the furnace of the boiler by feeding $CaCO_3$ containing absorbent, usually, limestone, into the furnace. At the temperatures prevailing in the furnace of a CFB boiler, usually, from 750° C. to 950° C., the $CaCO_3$ calcines to calcium oxide (CaO), which reacts with the sulfur oxides to produce calcium sulfate ($CaSO_4$), which can be removed from the furnace along with the ashes produced in the combustion.

In a circulating fluidized bed boiler, the bed is fluidized by introducing fluidizing gas through the bottom of the furnace by a relatively high nominal velocity, typically, from 3 m/s to 10 m/s. Because the upward flow of fluidizing gas entrains small-size particles of the bed, a CFB boiler comprises a particle separator that separates a portion of the entrained particles, generally, particles larger than a cut-off size of the particle separator, from the flue gas to be returned back to the furnace. In order to efficiently utilize the limestone in the furnace, the limestone particles should be operational in the bed for a sufficient residence time. This is generally achieved by introducing into the furnace limestone that is crushed to a particle size that is large enough to form CaO particles that are larger than the cut-off size of the particle separator. Thereby, the CaO particles entrained with the flue gas are multiple times separated from flue gas in the particle separator and returned back from the particle separator to the furnace.

When $SO_2$ reacts with the CaO particles, on the surface of the particles, forms a layer of dense $CaSO_4$, which prevents the core of the particles from reacting with the $SO_2$. Therefore, it is generally considered that there is an optimum size for the limestone particles, typically, 100 μm to 300 μm, to be fed to the furnace of a CFB boiler. The term particle size in this description refers to the median (d50) diameter of particle distribution as determined by a commonly used method, typically, by a laser diffraction based method. Even when using an optimum particle size, generally, an excess of limestone has to be fed into the furnace in order to obtain a desired level of $SO_2$ removal. For example, in order to achieve 98% sulfur reduction efficiency in the furnace, typically, a Ca/S molar ratio as high as three to four is required.

When using high Ca/S ratios, such as from three to four, the bottom ash and fly ash discharged from the furnace invariably contain a large amount of CaO, typically, from about 10% to more than 50%, which makes the use or disposal of the ashes difficult. Because calcination of $CaCO_3$ to CaO is an endothermic reaction, the calcination of excessive amounts of $CaCO_3$ also decreases the thermal efficiency of the boiler. An advantageous method for enhancing sulfur reduction in a CFB boiler without feeding very high amounts of $CaCO_3$ into the furnace is based on performing only a portion of the required $SO_2$ reduction in the furnace, and complementing $SO_2$ reduction in a semi-dry sulfur dioxide reduction device, such as a dry CFB scrubber or a spray dryer, arranged in the flue gas channel downstream of the furnace.

U.S. Pat. No. 7,427,384 suggests feeding calcium carbonate to the furnace of a circulating fluidized bed boiler so as to provide a Ca/S molar ratio of at most about 1.0 and further reducing the sulfur content of the flue gas by adding, for example, calcium hydroxide in a sulfur reducing stage arranged downstream of the furnace. Correspondingly, U.S. Pat. No 7,862,789 suggests conveying flue gases from a circulating fluidized bed boiler to a so-called flash dry absorber and introducing lime into the flash dry absorber.

Dry CFB scrubbers are commonly used for desulfurizing flue gases from combustion processes by using fresh hydrated lime as the sorbent. German patent No. 41 04 180 C1 teaches a method of desulfurizing flue gas of a CFB boiler by crushing and/or slaking CaO-containing fly ash particles separated from the flue gas of the boiler, and using the so treated particles as a sorbent in a dry CFB scrubber. U.S. Pat. No. 4,309,393 discloses a sulfur-reduction method for a fluidized bed boiler, in which CaO-containing ashes are collected from the furnace and slaked to form lime slurry for utilization in an $SO_2$ stripping unit, such as a spray dryer, disposed in the flue gas duct downstream of the furnace. These methods improve the integration of the two desulfurization stages by utilizing CaO-containing fly ash in the second sulfur reducing stage downstream the furnace. A disadvantage of the methods is that they require additional measures and special equipment for treating the collected fly to a suitable form to be used in the second sulfur reducing stage.

An object of the invention is to provide an improved method of reducing sulfur dioxide content in flue gas emanating from a circulating fluidized bed boiler plant so as to minimize at least a portion of drawbacks of the conventional methods described above.

SUMMARY OF THE INVENTION

The present invention provides a method of reducing sulfur dioxide emissions of a circulating fluidized bed boiler plant. The method comprises the steps of feeding a first stream of sulfur-containing carbonaceous fuel at a first feeding rate to a furnace of the boiler, feeding a second stream of calcium carbonate containing absorbent having a predetermined d50 particle size at a second feeding rate to the furnace, feeding oxygen containing gas to the furnace for fluidizing a bed of particles forming in the furnace, combusting the fuel with the oxygen, whereby the sulfur in the fuel is oxidized to sulfur dioxide, calcining the calcium carbonate to calcium oxide in the furnace and utilizing a portion of the calcium oxide to sulfate a first portion of the sulfur dioxide to calcium sulfate in the furnace, discharging flue gases, containing a second portion of the sulfur dioxide, and particles, including calcium oxide particles, entrained with the flue gases along a flue gas channel from the furnace, separating a first portion of the entrained particles, including a first portion of the entrained calcium oxide particles, from the flue gases in a particle separator having a cut-off size, and returning at least a portion of the separated particles via a return duct to the furnace, conveying a second portion of the entrained particles, including a second portion of the entrained calcium oxide particles, with the flue gases from the furnace to a semi-dry sulfur-reduction stage arranged downstream of the furnace, and reducing the sulfur dioxide content of the flue gases in the semi-dry sulfur-reduction stage, wherein the predetermined d50 particle size of the calcium carbonate containing absorbent is from 10 μm to 20 μm and less than 50% of the cut-off size of the particle separator.

According to an advantageous embodiment of the present invention, the stream of calcium carbonate containing absorbent is, prior to the feeding to the furnace, crushed to a median particle size that is smaller than 30% of the cut-off size of the particle separator. According to an especially advantageous embodiment of the present invention, the absorbent is crushed to a predetermined d50 particle size between 10 μm and 20 μm. The very-fine particle size results in a majority of the calcium oxide particles entrained with the flue gas to the particle separator to escape with the flue gas to the flue gas channel and only a smaller portion of the entrained calcium oxide particles is separated from the flue gas in the particle separator.

According to the present invention, the median, or d50, particle size of $CaCO_3$ particles fed into the furnace is considerably smaller than according to conventional practice. The use of so-called ultra-fine calcium carbonate particles, for example, particles having a median particle size in the range from about 10 μm to about 20 μm, is clearly against the conventional teaching of feeding much larger sulfur reducing sorbent particles, particles that are larger than the cut-off size of the particle separator, into the furnace of a circulating fluidized bed boiler. According to conventional teaching, the use of sorbent particles that are large enough, having a median of, for example, 150 μm, provides maximum efficiency by being multiple times returned from the particle separator back to the furnace.

The inventor of the present invention has surprisingly noticed that the present invention provides an especially efficient and economical overall sulfur reducing method due to the following advantages:

due to the very small particle size, the calcium carbonate particles are very efficiently calcined to calcium oxide in the furnace;

due to the very small particle size, a considerable portion of the calcium oxide particles reacts rapidly and efficiently with $SO_2$ in the furnace without leaving a harmful unreactive core of calcium oxide inside the particles;

due to the very small particle size, calcium oxide particles rapidly escape from the furnace and therefore bottom ash forming in the furnace contains only a negligible amount of calcium oxide; and the calcium oxide particles escaping from the furnace are, due to their very small particle size, readily usable, without pulverizing or slaking in an external hydrator, as sorbent in a semi-dry sulfur-reduction stage downstream of the furnace.

By feeding very fine calcium carbonate particles into the furnace of a CFB boiler, the residence time of the sorbent particles in the furnace is much shorter than in a conventional method utilizing, typically, about ten times larger sorbent particle size. According to the present invention, preferably, only at most 20%, even more preferably, only at most 10%, of the sorbent particles discharged from the furnace by the flue gas are separated from the flue gas in the particle separator and, correspondingly, preferably, at least 80%, even more preferably, at least 90% of them emanate from the particle separator with the flue gas. However, the fast rate and high efficiency of the sulfur reduction reactions in the furnace, the forming of less CaO containing bottom ash, and the usability of untreated fly ash as sorbent in a back-end sulfur reduction stage outweigh the negative effect of the short residence time in the furnace. Forming bottom ash that is less harmful than conventional bottom ash, and, in some cases, readily usable for further applications, is especially advantageous when combusting high ash fuels with high sulfur content.

It is estimated that, by feeding in the furnace, according to the present invention, ultra-fine limestone particles at a rate providing a Ca/S ratio of 1.5 to 2.5, a higher than 80% sulfur reduction can be obtained in the furnace. When the CaO particles escaping from the furnace are utilized in a semi-dry sulfur-reduction stage downstream of the furnace, the overall sulfur reduction and the total utilization of the calcium carbonate fed into the furnace may become very high. The overall sulfur reduction may be more than 98% and the utilization of the calcium fed into the furnace may be more than 70%.

The semi-dry sulfur-reduction stage is, typically, a dry CFB scrubber comprising a contact reactor and a dust separator, typically, a fabric filter. Sulfur reduction is performed in a conventional CFB scrubber by contacting the $SO_2$ containing flue gas with sorbent material, typically, slaked lime $(Ca(OH)_2)$, introduced into the contact reactor. The cleaned flue gas is then conducted to the dust separator to separate the reaction products, unreacted sorbent, and fly ash from the flue gas. A portion of the separated particles is removed from the system and another portion of the separated particles is recirculated back to the contact reactor, to form therein a particle bed to be fluidized by the flue gas stream entering into the contact reactor. Usually, the bed particles are moisturized by feeding water in the contact reactor or in the recirculation loop. The temperature of the bed can be controlled, and the sulfur reducing reactions enhanced, by the moisturizing of the bed.

According to an embodiment of the present invention, the sorbent material used in a dry CFB scrubber consists solely of ultra-fine CaO particles formed in the furnace and entrained by the flue gas to the CFB scrubber. Due to their small particle size, the entrained CaO particles can be easily slaked by the moisturizing water in the bed or particle circulation of the CFB scrubber. According to another embodiment of the present invention, additional sorbent material, typically, $Ca(OH)_2$, is fed to the contact reactor of the CFB scrubber. Thereby, due to the ultra-fine CaO particles entrained by the flue gas, the need for feeding conventional sorbent material to the contact reactor is considerably decreased.

When additional sorbent is fed to the CFB scrubber, the Ca/S ratio provided by the sorbent fed to the furnace is, preferably, from 1.0 to 2.0. When no additional sorbent is fed to the CFB scrubber, the Ca/S ratio of sorbent fed to the furnace is, preferably, from 2.0 to 3.0, even more preferably, from 2.5 to 3.5.

According to another embodiment of the present invention, the semi-dry sulfur-reduction stage downstream of the furnace is a spray dryer. In a conventional spray dryer, sorbent particles containing slurry is fed to a contact reactor, in which the sorbent particles rapidly dry and combine with sulfur dioxide in the flue gas. When using the present invention, the ultra-fine CaO particles entrained by the flue gas act usually as an additional sorbent in the contact reactor. Thereby, the amount of slurry to be fed to the contact reactor is considerably decreased. According to a preferred embodiment of the present invention, when using a spray dryer as the second sulfur reducing stage, the Ca/S ratio provided by the sorbent fed to the furnace is preferably from 1.0 to 2.0. According to a further preferred embodiment of the present invention, the slurry is prepared of particles collected by a dust separator downstream of a spray dryer, whereby it is possible that all of the sorbent used in the spray dryer originated from the $CaCO_3$ fed into the furnace. In this case, the Ca/S ratio of the sorbent fed into the furnace is preferably from 2.0 to 3.0, even more preferably, from 2.5 to 3.5.

The above brief description, as well as further objects, features, and advantages of the present invention will be more fully appreciated by reference to the following detailed description of the presently preferred, but nonetheless illustrative, embodiments in accordance with the present invention, when taken in conjunction with the accompanying drawings.

BRIEF DESCRIPTION OF THE DRAWINGS

In the following, the invention will be described with reference to the accompanying exemplary, schematic drawings.

DETAILED DESCRIPTION OF THE DRAWINGS

Figure 1:
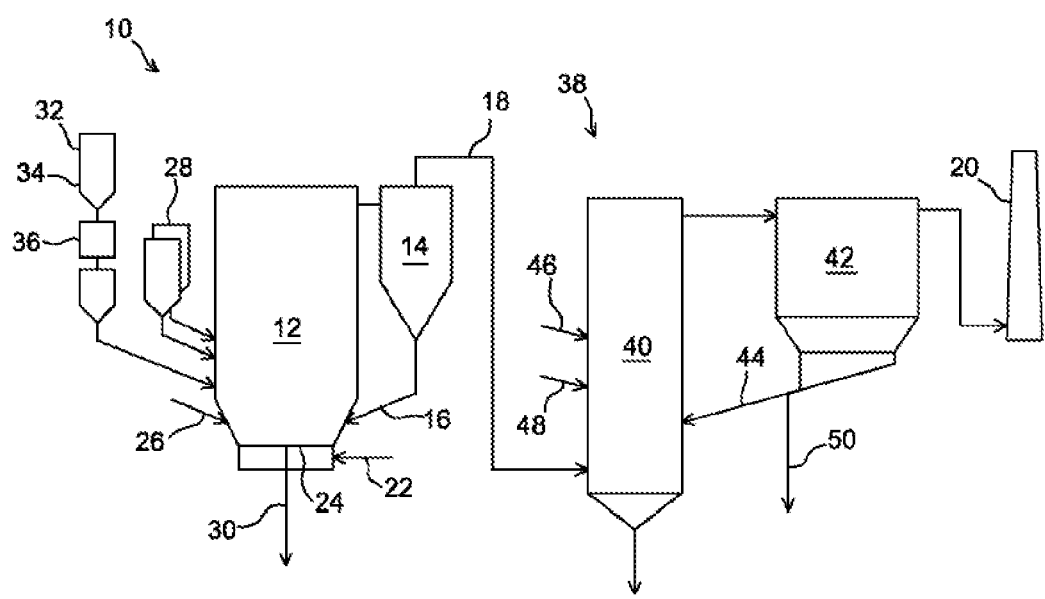
FIG. 1 shows a schematic diagram of a circulating fluidized bed boiler with equipment for reducing sulfur oxide emissions according to an embodiment of the present invention.

FIG. 1 schematically illustrates a CFB boiler system 10 that can be operated by using a method according to an embodiment of the present invention. The boiler system 10 comprises a furnace 12, a particle separator 14 with a return duct 16, and a flue gas channel 18 for directing flue gases discharged from the furnace 12 through a stack 20 to the environment. The boiler system 10 comprises conventional means 22 for feeding fluidizing gas, usually, primary air, to the furnace 12 through a bottom grid 24, and means 26 for introducing secondary air at a higher level of the furnace. The boiler system also comprises conventional means 28 for feeding sulfur-containing fuel, such as coal, petcoke or biofuel and, if needed, also inert bed material, such as sand, to the furnace 12. The fuel and inert bed material feeding means 28 comprise, for example, feed hoppers and feed conveyors, such as feed screws or pneumatic feeding systems.

When using the CFB boiler system 10, the fuel is combusted by the fluidizing air in a fluidized bed of fuel and inert bed material. Thereby, is formed bottom ash that is discharged from the furnace via conventional means 30 for discharging bottom ash comprising, for example, an ash conveyor and ash cooling means, from the furnace 12 to be disposed or for further use. The fluidizing gas flows upwards in the furnace 12 at a relatively high nominal velocity, typically, 3 m/s to 10 m/s, causing entrainment of bed particles by the flue gases formed in the combustion, which bed particles may then be discharged from the furnace 12. The particle separator 14 arranged in the flue gas channel 18 separates from the flue gas particles larger than a cut-off size, typically, about 50 μm to 100 μm, and returns them back to the furnace via the return channel 16.

The boiler system 10 also comprises means 32 for feeding $CaCO_3$-containing sulfur reducing additive, such as limestone, into the furnace. The means 32 for feeding the sulfur reducing additive comprise advantageously at least a hopper or bin 34 and a limestone crusher 36 for crushing the particles of the sulfur reducing additive to a desired median particle size (d50). Conventionally, limestone is crushed to a median particle size of about 100 μm to 300 μm, but, according to the present invention, the limestone is crushed, for reasons explained elsewhere in this description, to very-fine particles having a d50 particle size of 10 μm to 20 μm. The crushing of the sulfur reducing additive to the desired median particle size may alternatively take place in a separate plant, before the additive is brought to the CFB boiler plant.

A typical CFB boiler plant generally also comprises many other elements that are needed, e.g., for steam generation, material handling, and flue gas cleaning. However, because they are not of any particular importance to the present invention, they are not shown in FIG. 1.

When the sulfur-containing fuel is combusted in the furnace 12, the sulfur in the fuel oxidizes to sulfur oxides, mainly $SO_2$. In the temperatures prevailing in the furnace of a CFB boiler, typically, from 750° C. to 950° C., the $CaCO_3$ in the sulfur reducing additive is rapidly calcined to CaO, which then combines with $SO_2$ to form $CaSO_3$, which again oxidizes to $CaSO_4$. Because binding of $SO_2$ to $CaSO_4$ is a relatively slow process, limestone is conventionally fed into the furnace in a particle size that is larger than the cut-off size of the particle separator. Thereby, CaO particles entrained with the flue gas are multiple times separated from the flue gas in the particle separator and returned back to the furnace. The present method differs from such a conventional method in that, due to the very-fine particle size, preferably, more than 80%, even more preferably, more than 90% of CaO particles entrained with the flue gas are not separated from the flue gas in the particle separator, but they continue with the flue gas along the flue gas channels.

The bottom ash removed from the furnace 12 by the means 30 comprises, typically, a first portion of the Ca-containing particles formed in the process. Another portion of the Ca-containing particles is conventionally recycled between the furnace 12 and the particle separator 14 until the particles are pulverized in the fluidized bed to a size smaller than the cut-off size of the particle separator 14, whereafter, the particles are discharged from the furnace 12 as a part of fly ash.

The sulfation of the CaO particles to $CaSO_4$ takes place mainly on the outer surface of the particles. Therefore, conventional sulfur reduction in the furnace of a CFB boiler tends to form particles that have a dense layer of $CaSO_4$ around a core of unreacted CaO. Thus, the utilization of the CaO is not complete, and the fly ash and bottom ash contain unreacted CaO. Because the reactive CaO is harmful in the removed ash, it is often necessary to slake the CaO to $Ca(OH)_2$ before the removed ash is ready for disposal or further use. Due to the relatively low utilization of CaO in the furnace, high sulfur reduction level in the furnace has conventionally been achieved only by feeding $CaCO_3$ in abundance to the furnace, in a Ca/S ratio much higher than one, such as three to four.

Because of the difficulties related to the use of a high Ca/S ratio, recently, in some CFB boilers, the sulfur reduction in the furnace has been complemented by further sulfur reduction in a second sulfur reduction stage, such as a spray dryer or a dry CFB scrubber, arranged in the flue gas channel downstream of the furnace. Correspondingly, FIG. 1 shows a dry CFB scrubber 38 arranged in the flue gas channel 18.

When the sulfur reduction in the furnace is complemented by a second sulfur reduction stage, the Ca/S ratio of calcium fed into the furnace is naturally lower, such as one to two. However, a conventional method of feeding relative large limestone particles in the furnace gives always rise to the above-described Ca-particles with a dense layer of $CaSO_4$ around an unreacted CaO core, and to the above-mentioned problems.

The present method differs from the above-described conventional practice in that the CaO particles reacting in the furnace can, due to their very-fine particle size, be nearly completely sulfated. Thus, the loss of unreacted CaO to bottom ash is minimized, and the above-mentioned problems are largely eliminated. This leads to improved calcium utilization. It is assumed that, by using the present method, it is possible to decrease overall limestone consumption by at least 10%, and, in some cases, by 20% or even more.

A CFB scrubber 38 arranged in the flue gas channel 18 comprises a contact reactor 40, a dust separator 42, such as a fabric filter, and a recirculation channel 44 from the bottom of the dust separator 42 back to the contact reactor 40. The CFB scrubber 38 also comprises means 46 for injecting water to the fluidized bed forming in the contact reactor 40 for humidifying and cooling down the fluidized bed. A conventional SCB scrubber also comprises means 48 for injecting second sulfur reducing additive, usually, $Ca(OH)_2$, to the contact reactor 40. The $SO_2$ in the flue gas then combines with the $Ca(OH)_2$ in the contact reactor 40 to form $CaSO_3$ and $CaSO_4$. The means for injecting $Ca(OH)_2$ and water are usually arranged in the contact reactor 40, but in some case, they may alternatively be arranged, for example, in the recirculation channel 44.

The present method differs from the above-described conventional use of a supplementary CFB scrubber in that due to the very small particle size of the absorbent fed into the furnace, the flue gas entering into the CFB scrubber carries a considerable amount of very-fine CaO particles, which can readily be used as a sorbent in the CFB scrubber. Due to the small size of the CaO particles, there is no need to separate the particles from the flue gas stream upstream of the CFB scrubber and alter their chemical or physical characteristics, i.e., to slake the CaO particles and/or to diminish their particle size, before the particles are used in the CFB scrubber. By utilizing the very-fine CaO particles originating from the furnace as a sorbent in the CFB scrubber, it is possible to eliminate or at least to considerably decrease the need for injecting separate sulfur reducing additive to the CFB scrubber.

Particles, including fly ash, reaction products formed in the contact reactor 40 and unreacted reagent, are separated from the flue gas in the dust separator 42 downstream of the contact reactor 40. In order to maintain a sufficient particle bed in the contact reactor 40, and also to improve utilization of the reagent, a portion of the particles separated in the dust separator 42 is continuously recycled through the recirculation channel 44 back to the contact reactor 40. Another portion of the particulate matter separated in the particle separator 42 is discharged from the CFB scrubber along a discharge channel 50. Cleaned flue gas is conveyed from the dust separator further to a stack 20 to be released to the environment.

Figure 2:
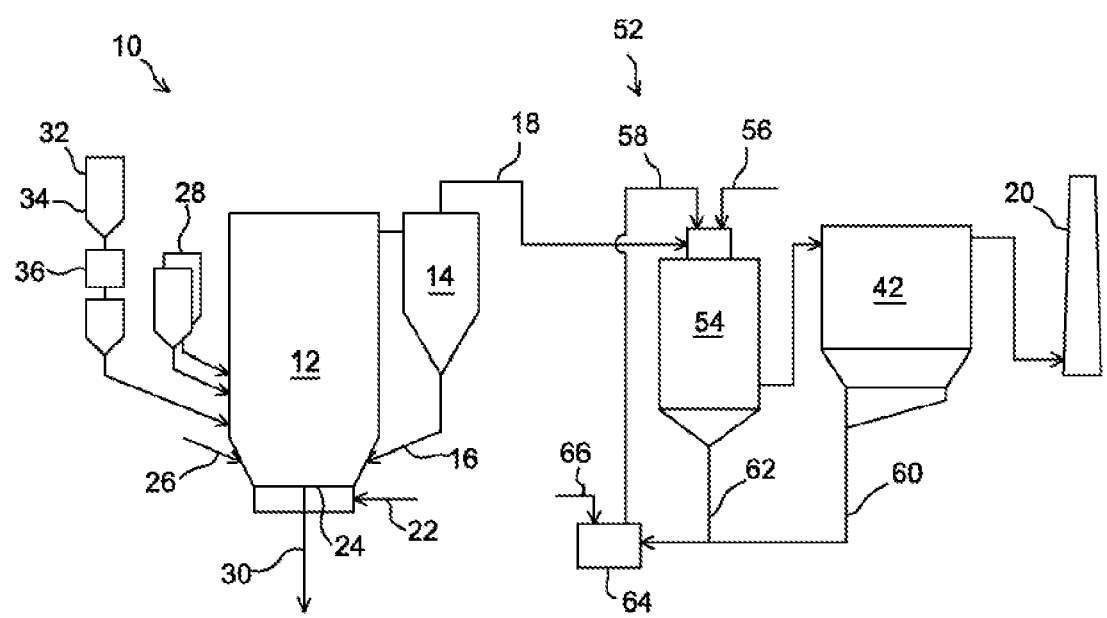
FIG. 2 shows a schematic diagram of a circulating fluidized bed boiler with equipment for reducing sulfur oxide emissions according to a second embodiment of the present invention.

FIG. 2 shows another preferred embodiment of the present invention, which differs from the embodiment shown in FIG. 1 in that the second sulfur reduction stage comprises a spray dryer 52 instead of a CFB scrubber 38. All elements in FIG. 2 that correspond to the same or similar element in the embodiment shown in FIG. 1 are numbered by the same reference number as in FIG. 1.

In the embodiment of FIG. 2, the flue gas duct 18 leads to an upper portion of the reaction chamber 54 of the spray dryer 52. In the reaction chamber 54, the sulfur dioxide containing flue gas contacts with humidified sulfur reducing sorbent. Unreacted sorbent, reaction products, and fly ash are conveyed with the flue gas from the reaction chamber 54 of the spray dryer 52 to a dust separator 42, preferably, a fabric filter. Cleaned flue gas is discharged from the fabric filter via a stack 20 to the environment, and fly ash, reaction products, and possible unreacted sorbent are collected via a discharge duct 60 from the bottom of the dust separator 42.

The humidified sorbent may, in some cases, consist solely of CaO particles entrained to the reaction chamber 54 with the flue gas and water injected with a water feed 56 to the upper portion of the reaction chamber 54. However, usually, the humidified sulfur reducing sorbent comprises, in addition to the CaO particles entrained with the flue gas, sorbent slurry formed in a slurry preparation vessel 64 and injected as small droplets to the reaction chamber 54 through a slurry feed 58. The slurry is usually made by adding water via a water feed 66 to $Ca(OH)_2$ or CaO, to slake the CaO to $Ca(OH)_2$, in a slurry preparation vessel 64. The $Ca(OH)_2$ or CaO may at least partly be collected by the discharge duct 60 from the bottom of the dust separator 42 and also by a discharge duct 62 from the bottom of the reaction vessel 54.

As explained above, the sulfur reducing sorbent used in the semi-dry sulfur reduction stage may, based on case specific reasons, both in the embodiment shown in FIG. 1 and in the embodiment shown in FIG. 2, originate solely of CaO particles formed in the furnace 12 of the boiler system 10, or of CaO particles formed in the furnace 12 of the boiler system 10, together with additional sorbent originating from a separate supply. However, in all cases, the very-fine limestone particles fed into the furnace give rise to very-fine CaO particles entrained with the flue gas, which minimize, i.e., decrease or totally eliminate, the need for feeding additional sorbent directly to the semi-dry sulfur reduction stage.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

The invention claimed is:

1. A method of reducing sulfur dioxide emissions of a circulating fluidized bed boiler plant, the method comprising the steps of:

feeding a first stream of sulfur-containing carbonaceous fuel at a first feeding rate to a furnace of the boiler;

feeding a second stream of calcium carbonate containing absorbent having a predetermined d50 particle size at a second feeding rate to the furnace;

feeding oxygen containing gas to the furnace for fluidizing a bed of particles forming in the furnace;

combusting the fuel with the oxygen, whereby the sulfur in the fuel is oxidized to sulfur dioxide;

calcining the calcium carbonate to calcium oxide in the furnace and utilizing a portion of the calcium oxide to sulfate a first portion of the sulfur dioxide to calcium sulfate in the furnace;

discharging flue gases, containing a second portion of the sulfur dioxide, and particles, including calcium oxide particles, entrained with the flue gases along a flue gas channel from the furnace;

separating a first portion of the entrained particles, including a first portion of the entrained calcium oxide particles, from the flue gases in a particle separator having a cut-off size, and returning at least a portion of the separated particles via a return duct to the furnace;

conveying a second portion of the entrained particles, including a second portion of the entrained calcium oxide particles, with the flue gases from the furnace to a semi-dry sulfur-reduction stage arranged downstream of the furnace; and reducing the sulfur dioxide content of the flue gases in the semi-dry sulfur-reduction stage, wherein the predetermined d50 particle size of the calcium carbonate containing absorbent is from 10 μm to 20 μm, and smaller than 50% of the cut-off size of the particle separator.

2. A method of reducing sulfur dioxide emissions of a circulating fluidized bed boiler plant according to claim 1, wherein the predetermined d50 particle size of the calcium carbonate containing absorbent is smaller than 30% of the cut-off size of the particle separator.

3. A method of reducing sulfur dioxide emissions of a circulating fluidized bed boiler plant according to claim 1, wherein more than 80% of the entrained calcium oxide particles are in the second portion of the particles and less than 20% of the entrained calcium oxide particles are in the first portion of the particles.

4. A method of reducing sulfur dioxide emissions of a circulating fluidized bed boiler plant according to claim 3, wherein more than 90% of the entrained calcium oxide particles are in the second portion of the particles and less than 10% of the entrained calcium oxide particles are in the first portion of the particles.

5. A method of reducing sulfur dioxide emissions of a circulating fluidized bed boiler plant according to claim 1, wherein the step of conveying is performed without diminishing the particle size of the entrained calcium oxide particles.

6. A method of reducing sulfur dioxide emissions of a circulating fluidized bed boiler according to claim 5, wherein a ratio of the first feeding rate to the second feeding rate is such that the molar ratio of calcium in the second stream to sulfur in the first stream (the Ca/S molar ratio) is from 1.5 to 2.5.

7. A method of reducing sulfur dioxide emissions of a circulating fluidized bed boiler according to claim 6, wherein no additional sorbent is fed to the semi-dry sulfur reduction stage.

8. A method of reducing sulfur dioxide emissions of a circulating fluidized bed boiler plant according to claim 1, wherein the of conveying is performed without slaking of the second portion of the entrained calcium oxide particles.

9. A method of reducing sulfur dioxide emissions of a circulating fluidized bed boiler plant according to claim 1, wherein the step of conveying is performed without any external treatment to alter the physical or chemical characteristics of the particle.

10. A method of reducing sulfur dioxide emissions of a circulating fluidized bed boiler according to claim 1, wherein a ratio of the first feeding rate to the second feeding rate is such that the molar ratio of calcium in the second stream to sulfur in the first stream (the Ca/S molar ratio) is from 2.5 to 3.5.

11. A method of reducing sulfur dioxide emissions of a circulating fluidized bed boiler according to claim 10, wherein no additional sorbent is fed to the semi-dry sulfur reduction stage.

12. A method of reducing sulfur dioxide emissions of a circulating fluidized bed boiler according to claim 1, wherein a ratio of the first feeding rate to the second feeding rate is such that the molar ratio of calcium in the second stream to sulfur in the first stream (the Ca/S molar ratio) is from 1.0 to 2.0.

13. A method of reducing sulfur dioxide emissions of a circulating fluidized bed boiler according to claim 12, wherein additional sorbent is fed to the semi-dry sulfur reduction stage.

* * * * *